United States Patent
Washnock et al.

(10) Patent No.: US 8,474,211 B1
(45) Date of Patent: Jul. 2, 2013

(54) SHEATHING FASTENING BRACKET SYSTEM

(76) Inventors: John T. Washnock, Dunedin, FL (US);
Dean D. Poisson, Clearwater, FL (US);
Mattia Lucciola, Belleair Beach, FL (US)

( * ) Notice: Subject to any disclaimer, the term of this patent is extended or adjusted under 35 U.S.C. 154(b) by 233 days.

(21) Appl. No.: 12/590,932

(22) Filed: Nov. 17, 2009

Related U.S. Application Data

(60) Provisional application No. 61/200,404, filed on Nov. 28, 2008.

(51) Int. Cl.
*E04D 1/34* (2006.01)
*E04D 1/00* (2006.01)
*E04B 1/00* (2006.01)

(52) U.S. Cl.
USPC ............... 52/547; 52/105; 52/520; 52/543

(58) Field of Classification Search
USPC ............ 52/90.1, 90.2, 478, 520, 543, 547, 52/712, 105
See application file for complete search history.

(56) References Cited

U.S. PATENT DOCUMENTS

| | | | | |
|---|---|---|---|---|
| 4,555,879 A | * | 12/1985 | Cheater | 52/90.1 |
| RE33,563 E | * | 4/1991 | Heckelsberg | 52/404.2 |
| 5,791,058 A | * | 8/1998 | Seifert | 33/1 HH |
| 6,295,780 B1 | * | 10/2001 | Thompson | 52/712 |
| 6,415,575 B1 | * | 7/2002 | Thompson | 52/712 |
| 6,446,409 B1 | * | 9/2002 | Emerson | 52/712 |
| 6,510,666 B1 | * | 1/2003 | Thompson | 52/712 |
| 6,640,516 B1 | * | 11/2003 | Thompson | 52/712 |
| 6,651,398 B2 | * | 11/2003 | Gregori | 52/489.1 |
| 2008/0034703 A1 | * | 2/2008 | Sensenig | 52/712 |

* cited by examiner

Primary Examiner — Andrew Triggs

(57) ABSTRACT

Each of a plurality of sheets, including a lowermost sheet, have an upper edge, a lower edge, parallel side edges, an upper surface, and a lower surface. A support includes a lower board beneath the sheets adjacent to the lower edges. Parallel boards beneath the sheets are at locations adjacent to and at spaced parallel locations between the side edges. Long brackets couple the lower edge of the lowermost sheet to one of the parallel boards and the lower board. Straight brackets couple one of the side edges of one of the sheets to one of the parallel boards there beneath. Short brackets couple the upper and lower edges of two adjacent of the sheets to one of the parallel boards there beneath.

1 Claim, 5 Drawing Sheets

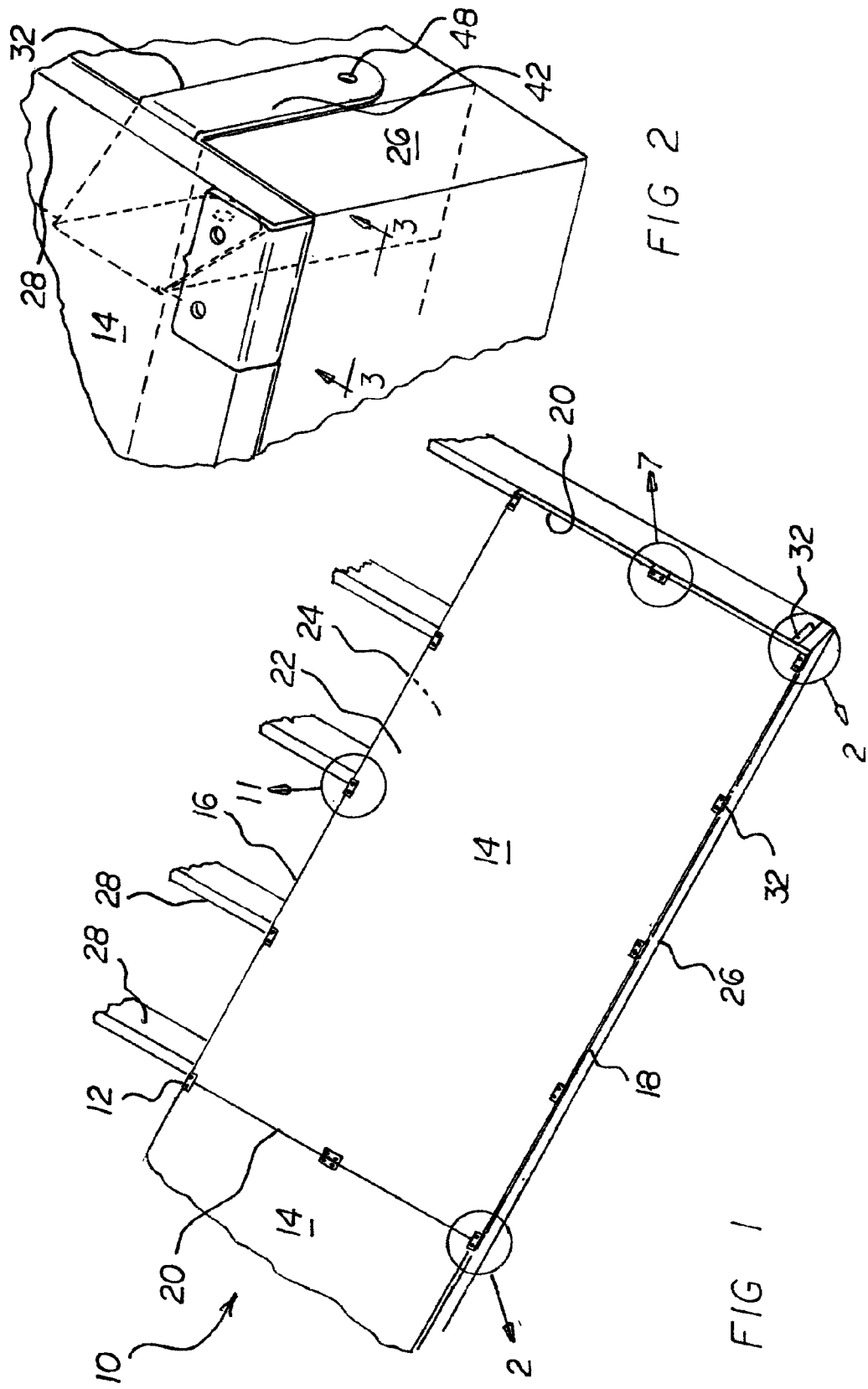

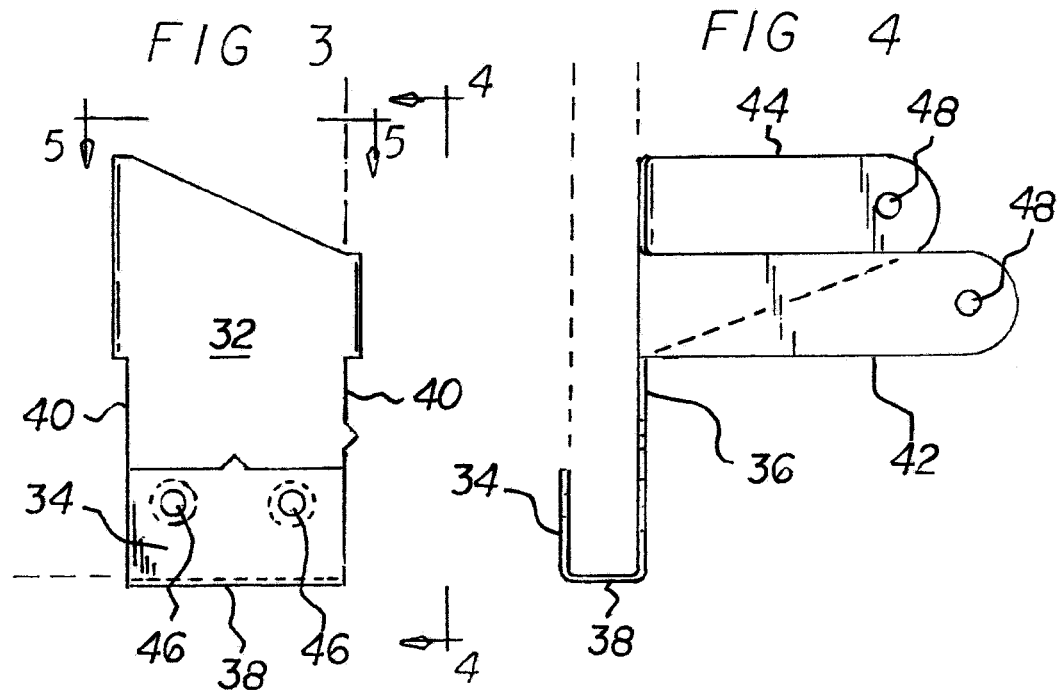
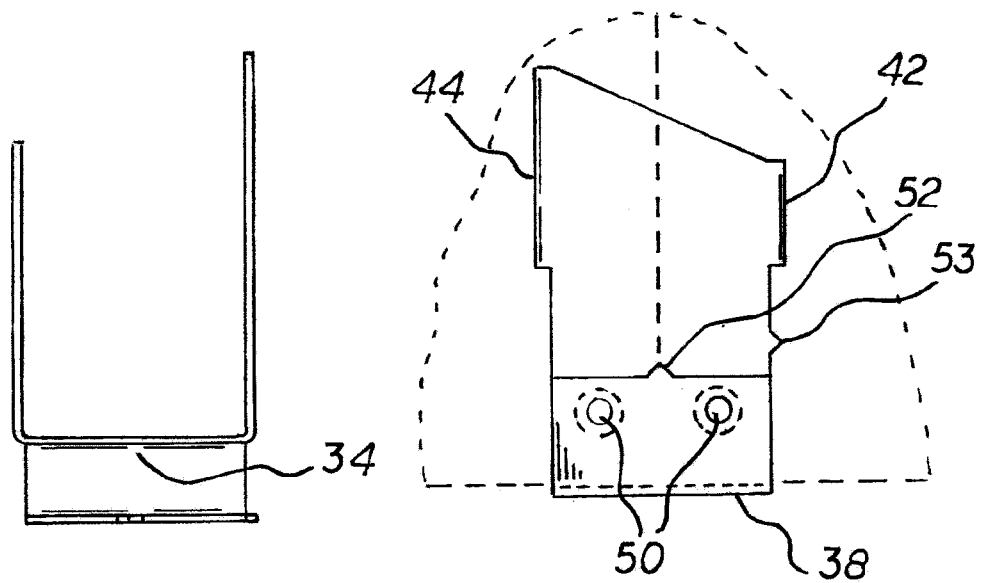

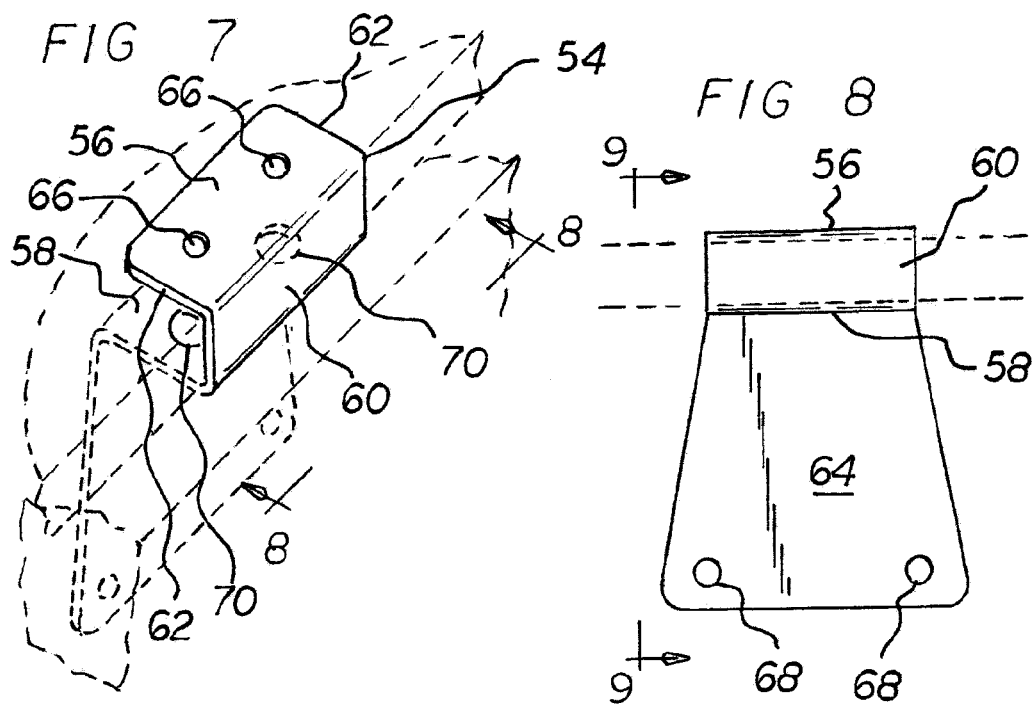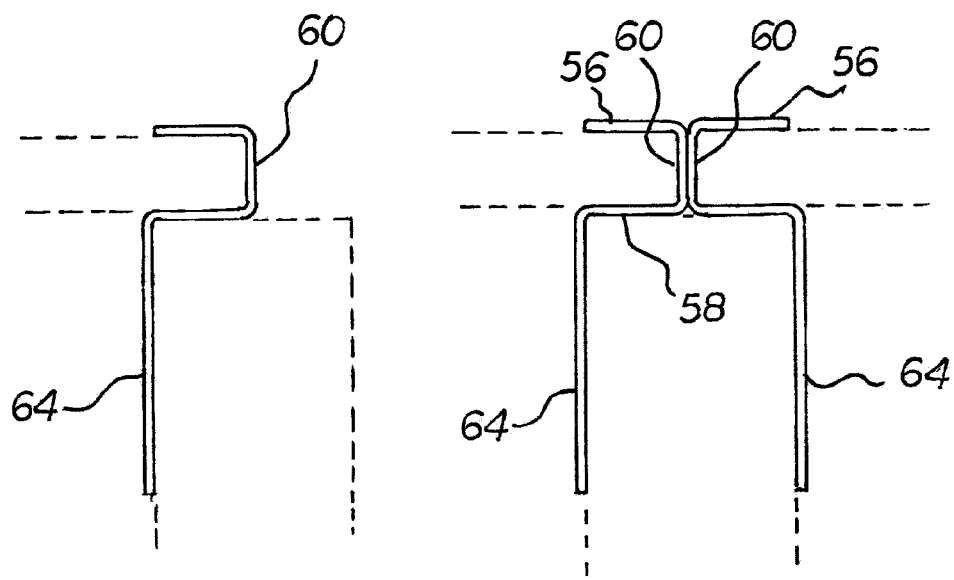

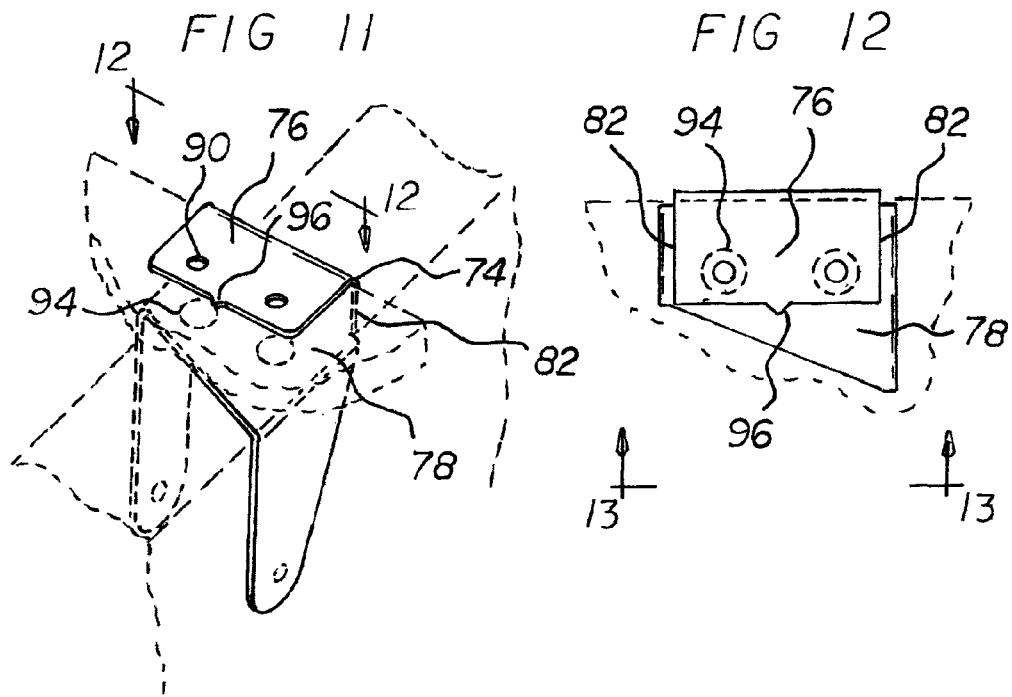
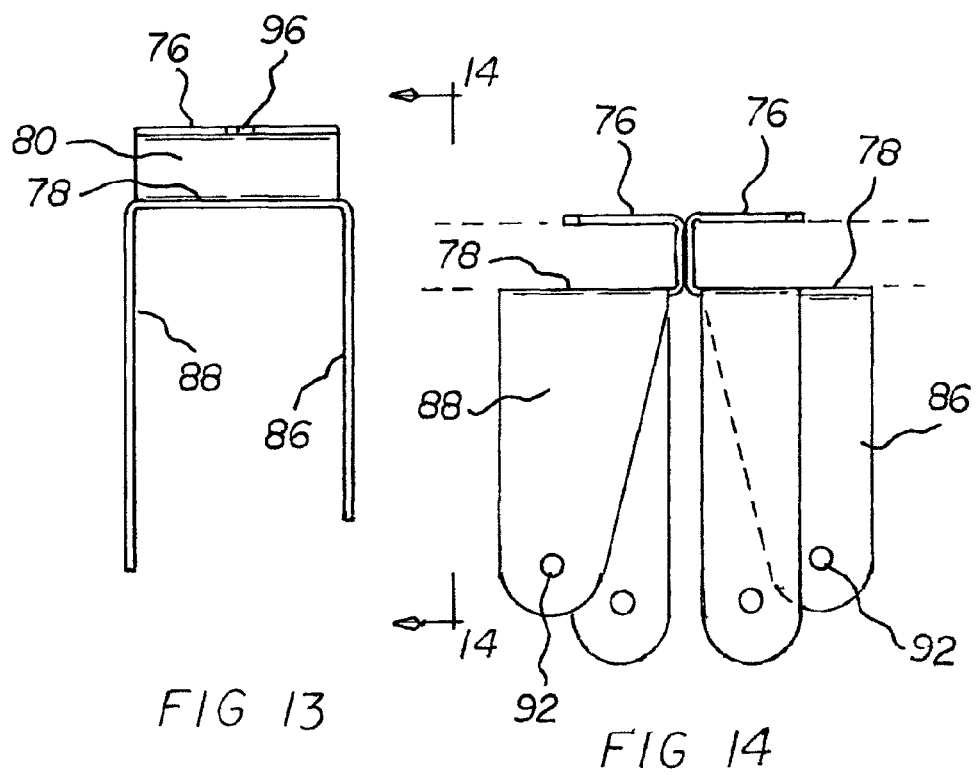

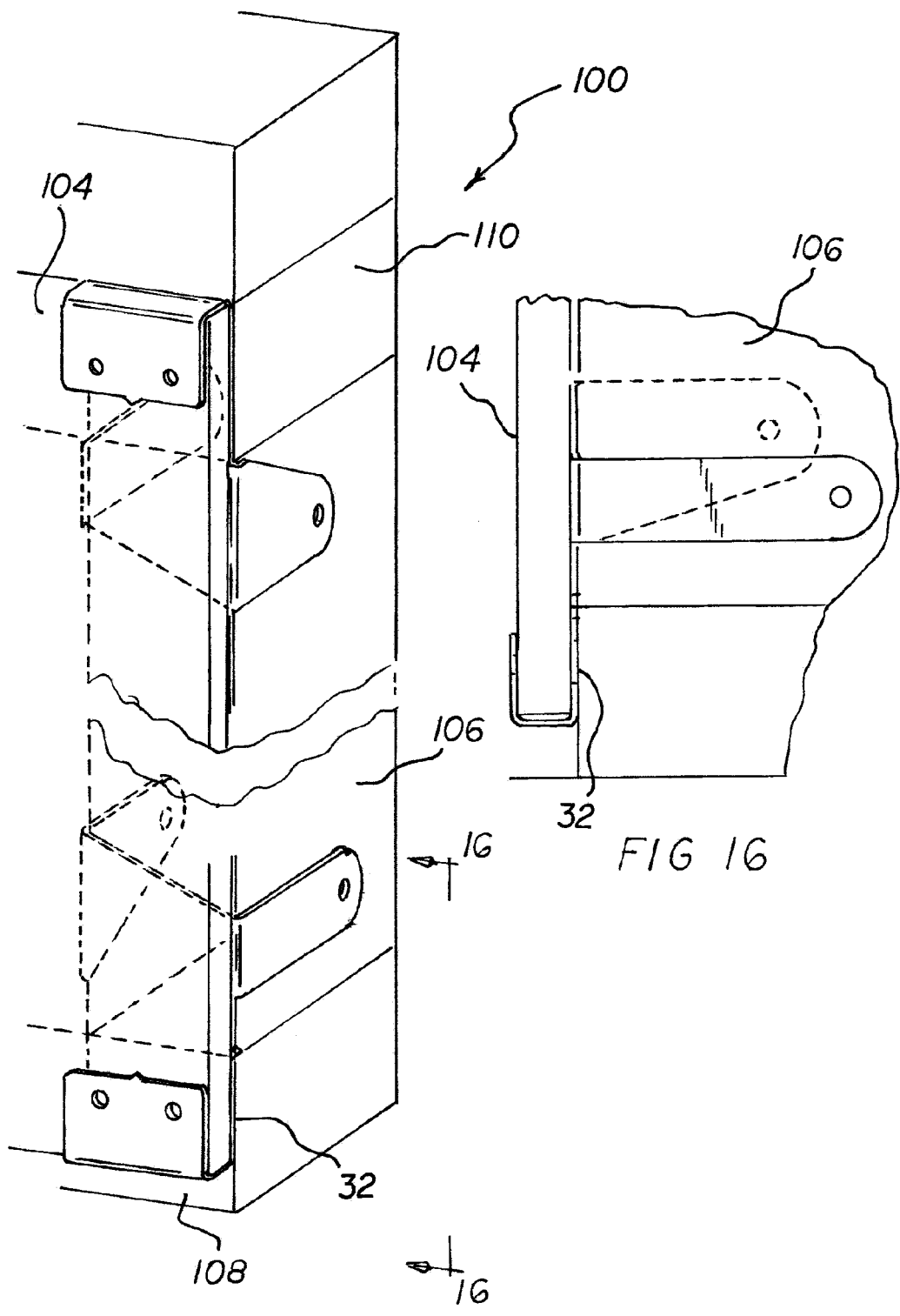

SHEATHING FASTENING BRACKET SYSTEM

RELATED APPLICATION

The present non-provisional application is based upon U.S. Provisional Application Ser. No. 61/200,404 filed Nov. 28, 2008, the subject matter of which is incorporated herein by reference.

BACKGROUND OF THE INVENTION

1. Field of the Invention

The present invention relates to a sheathing fastening bracket system and more particularly pertains to coupling together components of a roof assembly in a safe, convenient, and economical manner.

2. Description of the Prior Art

The use of sheathing fastening brackets of known designs and configurations is known in the prior art. More specifically, sheathing fastening brackets of known designs and configurations previously devised and utilized for the purpose of coupling components of a roof are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a sheathing fastening bracket system that allows coupling together components of a roof assembly in a safe, convenient, and economical manner.

In this respect, the sheathing fastening bracket system according to the present invention substantially departs from the conventional concepts and designs of the prior art, and in doing so provides an apparatus primarily developed for the purpose of coupling together components of a roof assembly in a safe, convenient, and economical manner.

Therefore, it can be appreciated that there exists a continuing need for a new and improved sheathing fastening bracket system which can be used for coupling together components of a roof assembly in a safe, convenient, and economical manner. In this regard, the present invention substantially fulfills this need.

SUMMARY OF THE INVENTION

In view of the foregoing disadvantages inherent in the known types of sheathing fastening brackets of known designs and configurations now present in the prior art, the present invention provides an improved sheathing fastening bracket system. As such, the general purpose of the present invention, which will be described subsequently in greater detail, is to provide a new and improved sheathing fastening bracket system and method which has all the advantages of the prior art and none of the disadvantages.

To attain this, the present invention essentially comprises a sheathing fastening bracket system. First provided is a roof assembly having a plurality of roofing sheets including a lowermost sheet. The roofing sheets are positionable in a co-planar relationship. Each roofing sheet has an upper edge and a lower edge. Each roofing sheet has parallel side edges between the upper and lower edges. Each roofing sheet also has an upper surface and a lower surface. The roof assembly also includes a sub-fascia board beneath the roofing sheets adjacent to the lower edges. Rafters are provided beneath the roofing sheets at locations adjacent to the side edges and at spaced parallel locations between the side edges.

The sheathing fastening bracket system includes a plurality of long brackets coupling the lower edge of the lowermost roofing sheet to the rafters and to the sub-fascia board. Each of the long brackets formed in a J-shaped configuration. Each long bracket has a short section having a length positionable in contact with the upper surface of a selected one of the roofing sheets. Each long bracket also has a long section having a length in contact with the lower surface of the selected one of the roofing sheets. Each long bracket has an intermediate section. The length of each long bracket is in contact with the lower edge of the selected one of the roofing sheets over the sub-fascia board. The short section and the long section and the intermediate section have first and second lateral edges spaced a common width. A long leg extends from the first lateral edge at a location remote from the intermediate section in a direction away from the short section. A short leg extends from the first lateral edge at a location remote from the intermediate section in a direction away from the short section. Primary fastener holes in the short section are for coupling to the selected one of the roofing sheets. A fastener hole in each of the legs is for coupling to one of the rafters. Access holes in the long section aligned with the primary fastener holes of the short section. A pointer is provided on each of the short sections. A pointer is provided on each of the long sections.

The sheathing fastening bracket system also includes a plurality of straight brackets coupling the side edges of the sheeting to the rafters. Each of the plurality of straight brackets is formed in a C-shaped configuration. Each of the straight brackets has an upper section having a length positionable in contact with the upper surface of the selected one of the roofing sheets. Each of the straight brackets has a lower section having a length in contact with the lower surface of the selected one of the roofing sheets. The length of the lower section is essentially equal to the length of the upper section. Each straight bracket has an intermediate section with a length in contact with the side edge of the selected one of the roofing sheets. The upper section and the lower section and the intermediate section have first and second lateral edges spaced a common width. Each straight bracket has a supplemental section parallel with the intermediate section and extending from the lower section at a location remote from the intermediate section in a direction away from the upper section. Primary fastener holes in the upper section are for coupling to the selected one of the roofing sheets. Secondary fastener holes in the supplemental section are for coupling to one of the rafters. Access holes in the lower section align with the primary fastener holes of the upper section.

The sheathing fastening bracket system also includes a plurality of short brackets. The short brackets couple adjacent upper and lower edges of a selected two adjacent of the roofing sheets and the upper edge of the uppermost roofing sheet to the rafters there beneath. Each of the plurality of short brackets is formed in a J-shaped configuration. Each short bracket has an upper section having a length positionable in contact with the upper surface of the selected one of the roofing sheets. Each short bracket has a lower section having a length in contact with the lower surface of the selected one of the roofing sheets. Each short bracket has an intermediate section having a length in contact with the side edge of the selected one of the roofing sheets. The short section and the long section and the intermediate section having first and second lateral edges spaced a common width. A long leg extends from the first lateral edge at a location remote from the intermediate section in a direction away from the upper section. A short leg extends from the first lateral edge at a location remote from the intermediate section in a direction away from the upper section. Primary fastener holes in the short section are for coupling to the selected one of the roofing sheets. A secondary fastener hole in each of the legs is for coupling to one of the rafters. Access holes in the lower section aligned with the primary fastener holes in the upper section. A pointer is provided on the upper section.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sheathing fastening bracket system which has all of the advantages of the prior art sheathing fastening brackets of known designs and configurations and none of the disadvantages.

It is another object of the present invention to provide a new and improved sheathing fastening bracket system which may be easily and efficiently manufactured and marketed.

It is further object of the present invention to provide a new and improved sheathing fastening bracket system which is of durable and reliable constructions.

An even further object of the present invention is to provide a new and improved sheathing fastening bracket system which is susceptible of a low cost of manufacture with regard to both materials and labor, and which accordingly is then susceptible of low prices of sale to the consuming public, thereby making such sheathing fastening bracket system economically available to the buying public.

Even still another object of the present invention is to provide a sheathing fastening bracket system for coupling together components of a roof assembly in a safe, convenient, and economical manner.

Lastly, it is an object of the present invention to provide a new and improved sheathing fastening bracket system having a plurality of sheets, including a lowermost sheet. Each sheet has an upper edge, a lower edge, parallel side edges, an upper surface, and a lower surface. A support includes a lower board beneath the sheets adjacent to the lower edges. Parallel boards beneath the sheets are at locations adjacent to and at spaced parallel locations between the side edges. Long brackets couple the lower edge of the lowermost sheet to one of the parallel boards and the lower board. Straight brackets couple one of the side edges of one of the sheets to one of the parallel boards there beneath. Short brackets couple the upper and lower edges of two adjacent of the sheets to one of the parallel boards there beneath.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a sheathing fastening bracket system constructed in accordance with the principles of the present invention.

FIG. 2 is an enlarged perspective showing of one corner of the system taken at Circle 2 of FIG. 1 illustrating the long bracket.

FIG. 3 is a top view of the long bracket taken along line 3-3 of FIG. 2.

FIGS. 4 and 5 are plan and side elevational views taken along line 4-4 and 5-5 of FIG. 3.

FIG. 6 is a front elevational view similar to FIG. 3 but illustrating a pointer positioning two roofing sheets.

FIG. 7 is an enlarged perspective showing of one side of the system taken at Circle 7 of FIG. 1 illustrating the straight bracket.

FIG. 8 is a front elevational view of the straight bracket taken along line 8-8 of FIG. 7.

FIG. 9 is a side elevational view taken along line 9-9 of FIG. 8 illustrating one straight bracket with one rafter or truss and one roofing sheets.

FIG. 10 is a side elevational view similar to FIG. 9 but illustrating two straight bracket with one rafter or truss and two roofing sheets.

FIG. 11 is an enlarged perspective showing of one interior corner of the system taken at Circle 11 of FIG. 1 illustrating the short bracket with one rafter and one roofing sheets.

FIG. 12 is a plan view of the short bracket taken along line 12-12 of FIG. 11.

FIG. 13 is a front view taken along line 13-13 of FIG. 12.

FIG. 14 is a side elevational view taken along line 14-14 of FIG. 13.

FIG. 15 is a perspective illustration of an alternate embodiment of the invention utilized with an exterior wall.

FIG. 16 is a side elevational view taken along line 16-16 of FIG. 15.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved sheathing fastening bracket system embodying the principles and concepts of the present invention and generally designated by the reference numeral 10 will be described.

The sheathing fastening bracket system 10 of the present invention is comprised of a plurality of components. Such components in their broadest context include a plurality of sheets, long brackets, straight brackets and short brackets. Such components are individually configured and correlated with respect to each other so as to attain the desired objective.

The sheathing fastening bracket system 10, as shown in FIGS. 1 through 14, is for coupling together components of a roof assembly. The coupling is done in a safe and convenient and economical manner.

First provided is a roof assembly 12. Note FIGS. 1 and 2. The roof assembly has a plurality of roofing sheets 14 including a lowermost sheet. The roofing sheets are positionable in a co-planar relationship. Each roofing sheet has an upper edge 16 and a lower edge 18. Each roofing sheet has parallel side edges 20 between the upper and lower edges. Each roofing sheet also has an upper surface 22 and a lower surface 24. The roof assembly also includes a sub-fascia board 26 beneath the roofing sheets adjacent to the lower edges. Rafters 28 are provided beneath the roofing sheets at locations adjacent to the side edges and at spaced parallel locations between the side edges.

The sheathing fastening bracket system includes a plurality of long brackets 32 coupling the lower edge of the lowermost roofing sheet to the rafters and to the sub-fascia board. Note FIGS. 3 through 6. Each of the long brackets formed in a J-shaped configuration. Each long bracket has a short section 34 having a length positionable in contact with the upper surface of a selected one of the roofing sheets. Each long bracket also has a long section 36 having a length in contact with the lower surface of the selected one of the roofing sheets. The length of the long section length is between 200 percent and 300 percent of the length of the short section. Each long bracket has an intermediate section 38. The length of each long bracket is in contact with the lower edge of the selected one of the roofing sheets over the sub-fascia board. The short section and the long section and the intermediate section have first and second lateral edges 40 spaced a common width essentially 300 percent of the length of the intermediate section. A long leg 42 extends from the first lateral edge at a location remote from the intermediate section in a direction away from the short section. A short leg 44 extends from the first lateral edge at a location remote from the intermediate section in a direction away from the short section. Primary fastener holes 46 in the short section are for coupling to the selected one of the roofing sheets. A fastener hole 48 in each of the legs is for coupling to one of the rafters. Access holes 50 in the long section aligned with the primary fastener holes of the short section. A pointer 52 is provided on each of the short sections. A pointer 53 is provided on each of the long sections.

The sheathing fastening bracket system also includes a plurality of straight brackets 54 coupling the side edges of the sheets to the rafters. Note FIGS. 7 through 10. Each of the plurality of straight brackets is formed in a C-shaped configuration. Each of the straight brackets has an upper section 56 having a length positionable in contact with the upper surface of the selected one of the roofing sheets. Each of the straight brackets has a lower section 58 having a length in contact with the lower surface of the selected one of the roofing sheets. The length of the lower section is essentially equal to the length of the upper section. Each straight bracket has an intermediate section 60 with a length in contact with the side edge of the selected one of the roofing sheets. The upper section and the lower section and the intermediate section have first and second lateral edges 62 spaced a common width essentially 300 percent of the length of the intermediate section. Each straight bracket has a supplemental section 64 parallel with the intermediate section and extending from the lower section at a location remote from the intermediate section in a direction away from the upper section. Primary fastener holes 66 in the upper section are for coupling to the selected one of the roofing sheets. Secondary fastener holes 68 in the supplemental section are for coupling to one of the rafters. Access holes 70 in the lower section align with the primary fastener holes of the upper section.

The sheathing fastening bracket system also includes a plurality of short brackets 74. The short brackets couple adjacent upper and lower edges of a selected two adjacent of the roofing sheets and the upper edge of the uppermost roofing sheet to the rafters there beneath. Note FIGS. 11 through 15. Each of the plurality of short brackets is formed in a J-shaped configuration. Each short bracket has an upper section 76 having a length positionable in contact with the upper surface of the selected one of the roofing sheets. Each short bracket has a lower section 78 having a length in contact with the lower surface of the selected one of the roofing sheets. The length of the lower section is between 100 percent and 175 percent of the length of the upper section. Each short bracket has an intermediate section 80 having a length in contact with the side edge of the selected one of the roofing sheets. The short section and the long section and the intermediate section having first and second lateral edges spaced a common width essentially 300 percent of the length of the intermediate section. A long leg 86 extends from the first lateral edge at a location remote from the intermediate section in a direction away from the upper section. A short leg 88 extends from the first lateral edge at a location remote from the intermediate section in a direction away from the upper section. Primary fastener holes 90 in the short section are for coupling to the selected one of the roofing sheets. A secondary fastener hole 92 in each of the legs is for coupling to one of the rafters. Access holes 94 in the lower section aligned with the primary fastener holes in the upper section. A pointer 96 is provided on the upper section.

Reference is now made to FIGS. 15 and 16 which illustrate an alternate embodiment of the system 100. In this alternate embodiment, the sheets are vertically oriented wallboard sheets 104. The parallel boards are studs 106. The lower board is a sill plate board 108. In this alternate embodiment, the system further includes a top plate board 110. The brackets of this alternate embodiment of the invention are the same as in the primary embodiment as shown in prior figures.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sheathing fastening bracket system for coupling together components of a roof assembly, the system consisting of:

a roof assembly including:
- a plurality of roofing sheets positionable in a co-planar relationship, consisting of a lowermost sheet, each roofing sheet having an upper edge and a lower edge and parallel side edges between the upper and lower edges, each roofing sheet also having an upper surface and a lower surface;
- a sub-fascia board beneath the roofing sheets adjacent to the lower edges;
- rafters beneath the'roofing sheets at locations adjacent to the side edges and at spaced parallel locations between the side edges;

a plurality of long brackets coupling the lower edge of the lowermost roofing sheet to the rafters and to the sub-fascia board, each of the long brackets formed in a J-shaped configuration having:
- a short section having a length positionable in contact with the upper surface of a selected one of the roofing sheets;
- a long section having a length in contact with the lower surface of the selected one of the roofing sheets, the long section length being between 200 percent and 300 percent of the length of the short section;
- an intermediate section having a length in contact with the lower edge of the selected one of the roofing sheets over the sub-fascia board;
- the short section and the long section and the intermediate section of each long bracket having first and second lateral edges spaced a common width essentially 300 percent of the length of the intermediate section;
- a long leg extending from the first lateral edge at a location remote from the intermediate section in a direction away from the short section;
- a short leg extending from the first lateral edge at a location remote from the intermediate section in a direction away from the short section;
- primary fastener holes in the short section for coupling to the selected one of the roofing sheets,
- a fastener hole in each of the legs for coupling to one of the rafters;
- access holes in the long section aligned with the primary fastener holes of the short section;
- a pointer on each of the short sections; and
- a pointer on each of the long sections;

a plurality of straight brackets coupling the side edges of the sheets to the rafters, each of the plurality of straight brackets formed in a C-shaped configuration having:
- an upper section having a length positionable in contact with the upper surface of the selected one of the roofing sheets,
- a lower section having a length in contact with the lower surface of the selected one of the roofing sheets;
- the length of the lower section being essentially equal to the length of the upper section;
- an intermediate section having a length in contact with the side edge of the selected one of the roofing sheets;
- the upper section and the lower section and the intermediate section having first and second lateral edges spaced a common width essentially 300 percent of the length of the intermediate section;
- a supplemental section parallel with the intermediate section and extending from the lower section at a location remote from the intermediate section in a direction away from the upper section;
- primary fastener holes in the upper section for coupling to the selected one of the roofing sheets;
- secondary fastener holes in the supplemental section for coupling to one of the rafters; and
- access holes in the lower section aligned with the primary fastener holes of the upper section; and a plurality of short brackets coupling adjacent upper and lower edges of a selected two adjacent of the roofing sheets and the upper edge of the uppermost roofing sheet to the rafters there beneath, each of the plurality of short brackets formed in a J-shaped configuration having:
- an upper section having a length positionable in contact with the upper surface of the selected one of the roofing sheets;
- a lower section having a length in contact with the lower surface of the selected one of the roofing sheets, the lower section length being between 100 percent and 175 percent of the length of the upper section;
- an intermediate section having a length in contact with the side edge of the selected one of the roofing sheets;
- the short section and the long section and the intermediate section having first and second lateral edges spaced a common width essentially 300 percent of the length of the intermediate section;
- a long leg extending from the first lateral edge at a location remote from the intermediate section in a direction away from the upper section;
- a short leg extending from the first lateral edge at a location remote from the intermediate section in a direction away from the upper section;
- primary fastener holes in the short section for coupling to the selected one of the roofing sheets;
- a secondary fastener hole in each of the legs for coupling to one of the rafters;
- access holes in the lower section aligned with the primary fastener holes in the upper section; and
- a pointer on the upper section.

* * * * *